United States Patent
Koo (10) Patent No.: US 9,793,818 B2
(45) Date of Patent: Oct. 17, 2017

(54) UNIT CURRENT TRANSFORMER DEVICE AND MAGNETIC INDUCTION POWER SUPPLYING DEVICE FOR LINEARLY CONTROLLING OUTPUT POWER BY USING THE SAME

(71) Applicant: FERRARISPOWER CO., LTD, Gyeonggi-do (KR)

(72) Inventor: Ja-Il Koo, Seongnam-si (KR)

(73) Assignee: FERRARISPOWER CO., LTD., Gyeonggi-do (KR)

( * ) Notice: Subject to any disclaimer, the term of this patent is extended or adjusted under 35 U.S.C. 154(b) by 0 days.

(21) Appl. No.: 14/760,464

(22) PCT Filed: Nov. 19, 2014

(86) PCT No.: PCT/KR2014/011120
§ 371 (c)(1),
(2) Date: Jul. 10, 2015

(87) PCT Pub. No.: WO2015/133704
PCT Pub. Date: Sep. 11, 2015

(65) Prior Publication Data
US 2016/0276950 A1    Sep. 22, 2016

(30) Foreign Application Priority Data

Mar. 4, 2014    (KR) ........................ 10-2014-0025317

(51) Int. Cl.
*H02M 5/45*    (2006.01)
*H02M 5/458*    (2006.01)
(Continued)

(52) U.S. Cl.
CPC ............ *H02M 5/458* (2013.01); *H01F 38/28* (2013.01); *H02J 50/12* (2016.02); *H01F 2038/305* (2013.01)

(58) Field of Classification Search
CPC ............ H02M 1/32; H02M 5/40; H02M 7/06; H02M 7/08; H02M 2001/007
(Continued)

(56) References Cited

U.S. PATENT DOCUMENTS 3,443,194 A * 5/1969 Cielo ........................ G05F 1/62
363/20
4,814,965 A * 3/1989 Petersen ........... H02M 3/33569
363/21.12
(Continued)

FOREIGN PATENT DOCUMENTS

JP    10-185962 A    7/1998
KR    10-1996-0035025 A    10/1996
(Continued)

*Primary Examiner* — Timothy J Dole
*Assistant Examiner* — Yusef Ahmed
(74) *Attorney, Agent, or Firm* — Masuvalley & Partners (57) ABSTRACT

The present invention relates to a unit current transformer device and a magnetic induction power supplying device, and particularly to a magnetic induction power supply unit capable of linearly adjusting output power according to the number of unit current transformer devices configured to have a specific resonance frequency. To this end, the unit current transformer device includes a current transformer inducing secondary current from primary current flowing through a line in a magnetic induction manner and having a resonant frequency double or greater than that of the primary current, and a converting unit converting an output of the current transformer to DC power.

6 Claims, 9 Drawing Sheets

(51) Int. Cl.
*H01F 38/28* (2006.01)
*H02J 50/12* (2016.01)
*H01F 38/30* (2006.01)

(58) Field of Classification Search
USPC .................................................. 324/126–127
See application file for complete search history.

(56) References Cited

U.S. PATENT DOCUMENTS

| | | | | |
|---|---|---|---|---|
| 6,756,776 | B2* | 6/2004 | Perkinson | H01F 38/30 324/126 |
| 7,388,761 | B1* | 6/2008 | Wang | H02M 3/33576 363/17 |
| 7,518,886 | B1* | 4/2009 | Lai | H02P 8/12 363/17 |
| 8,299,732 | B2* | 10/2012 | Hoadley | H02M 5/14 318/105 |
| 9,093,908 | B2* | 7/2015 | Takegami | H02M 3/33507 |
| 9,343,970 | B2* | 5/2016 | Yan | H02M 3/33569 |
| 9,385,638 | B2* | 7/2016 | Simms | H02P 27/06 |
| 2001/0012207 | A1* | 8/2001 | Nomura | H02M 3/33569 363/17 |
| 2002/0003713 | A1* | 1/2002 | Nakawaga | H02M 1/4208 363/72 |
| 2002/0012257 | A1* | 1/2002 | Takahama | H02M 3/337 363/95 |
| 2003/0038612 | A1* | 2/2003 | Kutkut | H02M 3/33561 320/140 |
| 2005/0270805 | A1* | 12/2005 | Yasumura | H02M 3/3376 363/16 |
| 2006/0062025 | A1* | 3/2006 | Yasumura | H02M 3/3376 363/16 |
| 2006/0176714 | A1* | 8/2006 | Yasumura | H02M 3/33507 363/20 |
| 2006/0187687 | A1* | 8/2006 | Yasumura | H02M 3/33507 363/21.01 |
| 2009/0021237 | A1* | 1/2009 | Nakajima | G01R 15/183 324/76.12 |
| 2010/0008107 | A1* | 1/2010 | Mallwitz | H02M 3/33576 363/21.02 |
| 2010/0301676 | A1* | 12/2010 | Hernandez | H02M 3/337 307/82 |
| 2011/0157928 | A1* | 6/2011 | Ku | H02J 3/383 363/37 |
| 2013/0187637 | A1* | 7/2013 | Saxby | G01R 21/00 324/127 |
| 2013/0279215 | A1* | 10/2013 | Skjellnes | H02M 1/32 363/37 |
| 2014/0078791 | A1* | 3/2014 | Gurudasani | H02M 7/5387 363/37 |
| 2015/0049516 | A1* | 2/2015 | Yan | H02M 3/33507 363/17 |
| 2015/0326031 | A1* | 11/2015 | Yamaguchi | H02J 17/00 307/104 |

FOREIGN PATENT DOCUMENTS

| | | |
|---|---|---|
| KR | 10-2008-0068849 A | 7/2008 |
| KR | 10-2010-0001504 A | 1/2010 |
| KR | 10-1288148 B1 | 7/2013 |

* cited by examiner

UNIT CURRENT TRANSFORMER DEVICE AND MAGNETIC INDUCTION POWER SUPPLYING DEVICE FOR LINEARLY CONTROLLING OUTPUT POWER BY USING THE SAME

TECHNICAL FIELD

The present invention relates to a unit current transformer device and a magnetic induction power supplying device, and particularly to a magnetic induction power supply unit capable of linearly adjusting output power according to the number of unit current transformer devices configured to have a specific resonance frequency.

BACKGROUND ART

Typically, a current transformer for generating power by using a magnetic field generated in a distribution line is required to be separately designed and manufactured by considering characteristics of the current transformer, such as the size and capacity thereof, according to an installment position, since line current on the distribution line is not constant in real time, and furthermore a change width is large according to the position thereof.

Moreover, as a desired power amount increases, the size of the current transformer tends to be increased, and in particular, the case for a separable current transformer, an increase in output power amount is costly and effortful by increasing the size of the current transformer.

Even when this separable current transformer is capable of being designed and manufacturing, since manufacturing an enclosure of the current transformer has many technical limitations and is costly, implementation of a power supplying device by using a separable current transformer is costly and limited.

In particular, since most of current transformers are mainly used as a sensor rather than a power generator, an increase in power output amount has been researched only in the point of view of improving a signal-to-noise ratio, and a research on a separable magnetic core as a power supplying device is still insignificant.

Furthermore, since the distribution lines have various minimum line currents according to an installment environment, power that the power supplying device may generate by using the current transformer is limited and accordingly the current transformer is required to be differently designed according to each environment. In addition, since the size of the current transformer varies according to a system using a minimally required power amount, lots of time and expense are required to obtain desirable power amount.

Figure 1:
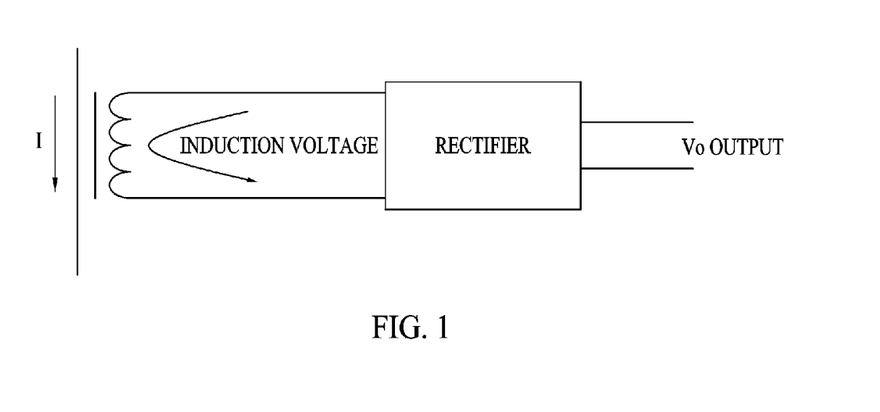
FIG. 1 is a conceptual diagram of a power supplying device for distribution line.
Figure 2A:
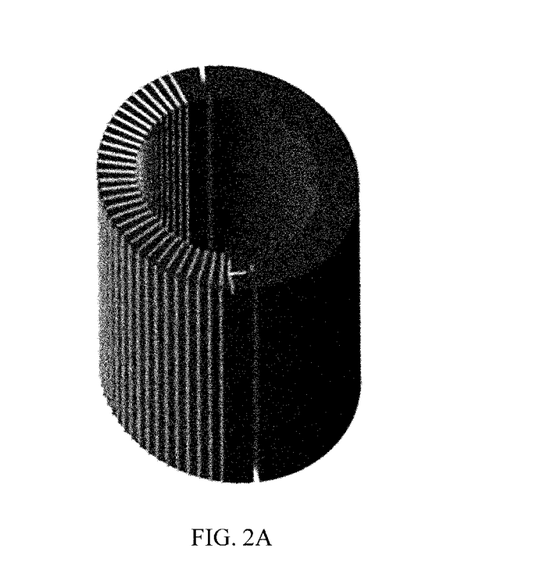
FIGS. 2A to 2D are a perspective view of a separable magnetic core.
Figure 2B:
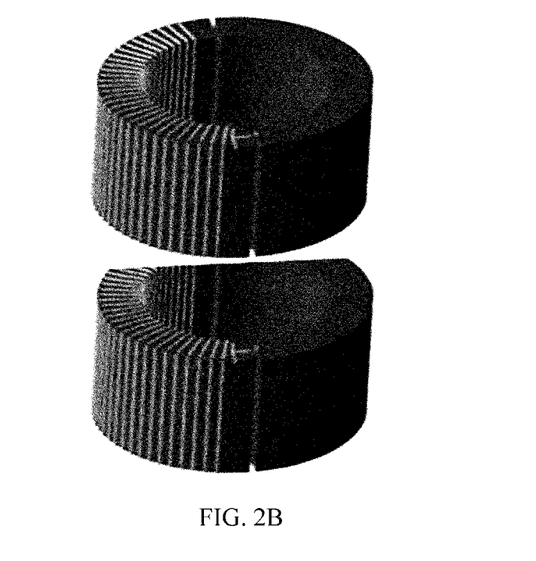
Figure 2C:
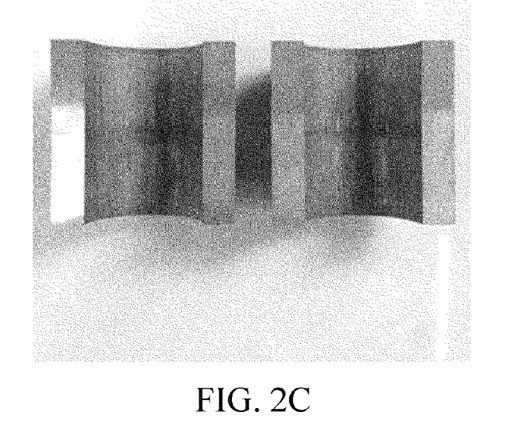
Figure 2D:
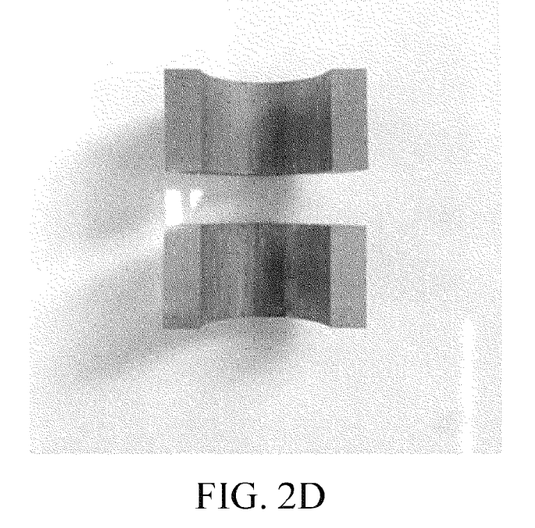

Hereinafter, difficulty in design of an output of magnetic induction power supplying device will be described in relation to FIGS. 1 to 2D. FIG. 1 is a conceptual diagram of a power supplying device for the distribution current, and FIGS. 2A to 2D are perspective views of a separable magnetic core.

As illustrated in FIG. 1, the power supplying device for distribution line includes a current transformer CT inducing AC current by primary current I flowing through the distribution line, and a rectifier converting the induction voltage corresponding to the AC current induced by the current transformer CT into a DC voltage. At this point, an output voltage Vo of the current transformer may be determined according to the size of the magnetic core.

Furthermore, the current transformer may use a separable magnetic core in consideration of ease of installation and removal, or as shown in FIG. 1B, may use identical or similar magnetic cores in plural. For example, FIG. 1C shows a separable magnetic core having the inner diameter of 44 mm, the outer diameter of 75 mm, and the length of 90 mm. FIG. 1D shows two separable magnetic cores having the inner diameter of 44 mm, the outer diameter of 75 mm, and the length of 45 mm, and the two separable magnetic cores are combined to have identical dimensions to those shown in FIG. 1C.

In addition, as the required output power increases in order to increase power induced by a current transformer, it is better to use a magnetic core having dimensions as large as possible, for example, having a longer length, as shown in FIG. 1A or 1C. However, this has limitations as follows.

First, for general characteristics of a magnetic core, the magnetic inductance L generated in the magnetic core by line current, and a resonant frequency f of a current transformer at this point are expressed as the following Equations (1) and (2).

Equation 1

$$L = \frac{4\pi\mu_r n^2 S}{l} 10^{-7} [H] \quad (1)$$

Equation 2

$$f = \frac{1}{2\pi\sqrt{LC}} \quad (2)$$

where, $\mu_r$ denotes the relative permeability of the magnetic core, l denotes the length of a magnetic field loop in the magnetic core, n denotes the number of windings of coil wound around the magnetic core, and S denotes a cross-section area of the magnetic core.

As may be seen from Equations (1) and (2), in order to increase a magnetic field induced in the magnetic core, it is required to increase the number of windings of coil and dimensions of the magnetic core, for example, the cross-section area and relative permeability of the magnetic core. However, this results in increases in magnetic inductance and capacitance and decreases the resonant frequency f. In particular, the resonant frequency f becomes close to frequency of line current, namely 60 Hz (or 50 Hz) at the time of power-on, which results in losing a function as the power supplying device.

In addition, from the point of view of manufacturing the magnetic core, as the dimensions become larger, the manufacturing cost increases and accordingly an enclosure design cost also greatly increases. Accordingly, it is cheaper to manufacture the magnetic core of a size shown in FIG. 2D, the resonant frequency of which is considered, and to obtain the same effect as that shown in FIG. 2C. In other words, it is better to manufacture the current transformer having a unit size shown in FIG. 2D to increase power. However, even in this case, since output power does not increase in proportion to addition of the current transformer having a unit size, it is difficult to design a system that matches a magnitude of the output.

In detail, the magnitude φ of magnetic flux, which excites the coil winding the magnetic core, is expressed as Equation (3).

Equation 3

$$\phi = \frac{\mu_0}{2\pi}\mu_r W l \ln\left(1 + \frac{h}{r}\right) \quad (3)$$

where W denotes the width of the magnetic core, h denotes the height of the magnetic core, $\mu_r$ denotes the a relative permeability of the magnetic core, and $\mu_0$ denotes a vacuum permeability expressed as $\mu_0 = 4\pi 10^{-7} (H/m)$.

At this point, a voltage induced at a terminal of the coil is expressed as Equation (4).

Equation 4

$$v = -N\frac{d\phi}{dt} \quad (4)$$

where N denotes the number of windings of the coil.

A root mean square (RMS) value of the induced voltage is expressed as Equation (5) by using Equations (3) and (4).

Equation 5

$$v_r = NIWf\mu_0\mu_r \ln\left(1 + \frac{h}{r}\right) \quad (5)$$

where f is a frequency of induction current.

Although not including a modeling of an air gap generated in the cross-section of the separable magnetic core, the above Equations are sufficient to analyze an overall operation of the current transformer.

At this point, the line current I of the distribution line is expressed as Equation (6) and the induction current of the magnetic core by the line current is expressed as Equation (7).

Equation 6

$$I = I_0 \cos(2\pi f t) \quad (6)$$

Equation 7

$$i = i_0 \cos(2\pi f t + \theta) \quad (7)$$

where θ denotes a phase difference between the excitation voltage and excitation current, which is because the coil functions as an inductive load and a capacitive load on an AC line and accordingly the excitation voltage and excitation current have different phases.

Finally, the induced power in the coil is expressed as the Equation (8).

Equation 8

$$P = v_0 i_0 \mu_r \cos(\theta) \quad (8)$$

Here, according to usage degrees by users, maximum values $v_0$ and $i_0$ of induction voltage and current changes in real time, and accordingly $\mu_r$ changes. In addition, the magnetic φ of magnetic flux induced in the magnetic core also changes and resultantly, the amplitudes of the induction voltage and current, and phase difference θ also change. Accordingly, although an output of the magnetic core is added, the output power does not become doubly increased by differences in the size and phases of the induced voltage and current.

Figure 3:
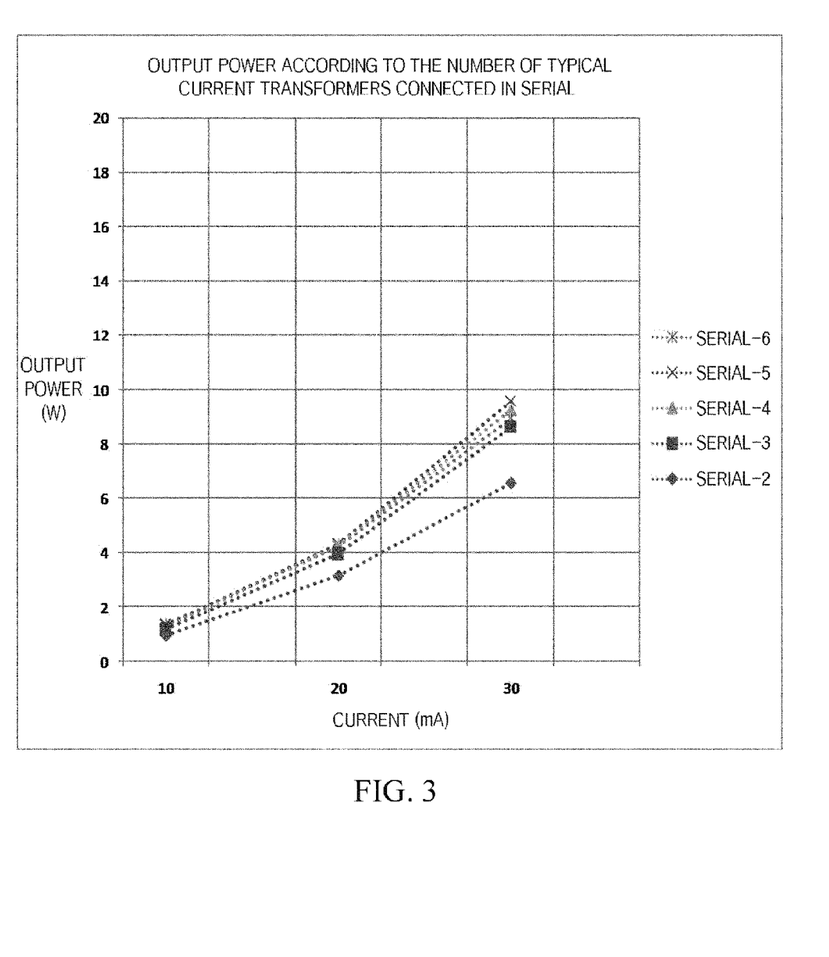
FIG. 3 is a graph representing output power according to the number of typical current transformers connected in serial.

FIG. 3 is a graph representing output power according to the number of typical current transformers connected in serial.

As represented in FIG. 3, when the magnetic cores are simply connected in serial, an output power amount increases according to an increase in current of the distribution line but does not increase in proportional to the number of magnetic cores connected in serial.

In order to address this issue, except for changes in maximum values of the induction voltage and current generated by at least a magnitude change rate of line current, reduction in the maximum output generated by the phase difference of the voltage and current should be prevented.

Furthermore, the power supplying device in a separable magnetic core type, which uses induction power using a magnetic field, is a power supply device as itself, and generally enables an increase in power by increasing the size of the magnetic core or connecting a plurality of small cores in serial. However, as disclosed in Korean Patent Application Laid-open Publication No. 10-2009-0088179, an increase in the number of magnetic cores does not allow the induction voltage to be increased proportionally to the output power.

Accordingly, the following requirements are to be satisfied in order to realize the power supplying device by using the separable magnetic core.

(1) An output power amount is required to be easily handled according to a current magnitude of the distribution line.

(2) Desirable output power is required to be easily achieved only by just adding a current transformer regardless of a minimum current magnitude of the distribution line.

(3) An enclosure design is required to be easy regardless of a desirable output amount and the separable current transformer is required to be easily manufactured.

(4) The size of the separable current transformer is required to be determined as a size of not being influenced by a resonant frequency.

DISCLOSURE OF THE INVENTION

Technical Problem

In order to address the foregoing limitations of typical techniques, the present invention provides a unit current transformer device capable of easily adding to or removing from a distribution line if necessary in order to linearly adjust output power.

In addition, the present invention also provides a magnetic induction power supply device capable of linearly adjusting output power by using a unit current transformer device, which does not need to manufacture additional enclosure or may minimize additional manufacturing.

Technical Solution

In order to address the foregoing limitations, a unit current transformer device of the present invention includes: a current transformer inducing secondary current from primary current flowing through a line in a magnetic induction manner and having a resonant frequency double or greater than that of the primary current; and a converting unit converting an output of the current transformer to DC power.

In an embodiment, the current transformer may have a cross-section area, a length, a relative permeability, and a number of loop windings around the magnetic core satisfying the resonant frequency.

In an embodiment, the current transformer may have a minimum size for satisfying the resonant frequency.

In an embodiment, the current transformer may be a separable current transformer that is detachable from the line.

In an embodiment, the converting unit may include: a primary voltage rectifying unit converting the induction current of the current transformer to a DC voltage; a current converting unit converting an output voltage of the primary voltage rectifying unit to current; and a secondary current rectifying unit converting output current of the current converting unit to DC current.

In an embodiment, the current converting unit may be controlled with pulse width modulation According to another aspect of the present invention, a magnetic induction power supplying unit for linearly adjusting output power, includes: a plurality of unit current transformer devices of any one of claims 1 to 6; and a summing unit summing DC currents output from the plurality of unit current transformer devices to output the summed result.

In an embodiment, the output of the summing unit may be linearly proportional to the number of the plurality of unit current transformer devices.

In an embodiment, the magnetic induction power supplying unit may further include a DC/AC converting unit converting an output of the summing unit to AC power.

Advantageous Effects

The unit current transformer device according to the present invention has effects that desirable output power may be easily designed by simply adding or removing a unit current transformer device to or from identical unit current transformer devices capable of linearly summing regardless of current flowing through the distribution line.

In addition, the unit current transformer device according to the present invention is detachable from the distribution line so as to easily add or remove a unit current transformer device to or from the line according to a desirable output condition, and accordingly may improve convenience of installment and maintenance, and reduce a maintenance expense.

The magnetic induction power supplying unit for linearly adjusting output power according to the present invention may linearly increase an output by simply adding or removing a unit current transformer device, and accordingly may easily achieve a design of desirable output power.

In addition, the present invention does not need to manufacture a separate enclosure or may minimize additional manufacturing by using a current transformer device configured of a minimum sized unit device, and accordingly may effectively reduce the manufacturing cost.

MODE FOR CARRYING OUT THE INVENTION

Hereinafter, embodiments of the present invention will be described in detail with reference to the accompanying drawings so that the present invention can be easily realized by those skilled in the art. The present invention can be practiced in various ways and is not limited to the embodiments described herein.

The present invention pertains to method for configuring a part of a power supplying device to obtain a minimum output amount of a desirable separable current transformer according to arbitrarily variable current of a distribution line.

In addition, the present invention pertains to a power supplying device using induction voltage and current of a magnetic core separable from a high voltage distribution line, and to a power supplying device capable of securing necessary power by simply adding or removing identical unit current transformer devices regardless of current flowing through the distribution line.

In order to address typical limitations, the present invention may arbitrarily adjust a minimum power amount obtainable from variable minimum current through the distribution line, and may not additionally require the enclosure design, and may accordingly reduce cost, by employing a separable magnetic core in a unit device, combining this with a converting unit to design as the unit device, and adding or removing the unit device. Since this increases convenience of installment and maintenance of a power supplying device, the overall maintenance expense may be reduced.

For example, the output power amount may be increased in proportion to the number of unit current transformer devices by configuring a minimum sized current transformer, which is fit to the size of the distribution line, to convert an output of each current transformer in a minimum unit into a DC voltage and current having necessary magnitudes through a power converting unit, and then by summing outputs thereof, instead of using the typical method for forming a separable current transformer having a size fit to an output amount, or for directly connecting a plurality of current transformers to obtain output power thereof.

In addition, as a technique necessary for using as a power supplying device a separable current transformer having been used for a sensor or data coupler, the present invention pertains to a power supplying device using a unit current transformer device that is capable of allowing an output signal thereof to easily satisfy a distribution line environment and desirable output power amount. In detail, the present invention pertains to a method for arbitrarily adjusting a minimum output power amount of the current transformer device by easily adding or removing the unit current transformer device without redesigning or manufacturing a separate current transformer and a power inverter related thereto according to a use environment.

Accordingly, a unit current transformer device and a power supplying device using the same according to an embodiment are considered to satisfy the following requirements.

(1) In order to overcome that a change width of line current is changed according to a position of a distribution line, a separable unit current transformer device should be manufactured in an addible and removable manner, and the inner diameter, outer diameter, and thickness thereof should be made by a unit in consideration of the size of distribution line in use and a manufacturing method, thereby easily adding to or removing from the distribution line if necessary.

(2) A desirable power output is required to be freely adjusted by adding or removing a separable current transformer.

(3) It is not necessary to manufacture a separate enclosure according to an added unit current transformer device, and the separate enclosure should be minimally manufactured if necessary.

Hereinafter, a description will be provided about a configuration principle of a power supplying device capable of linearly adjusting an output with a unit current transformer device according to an embodiment of the present invention.

Figure 4:
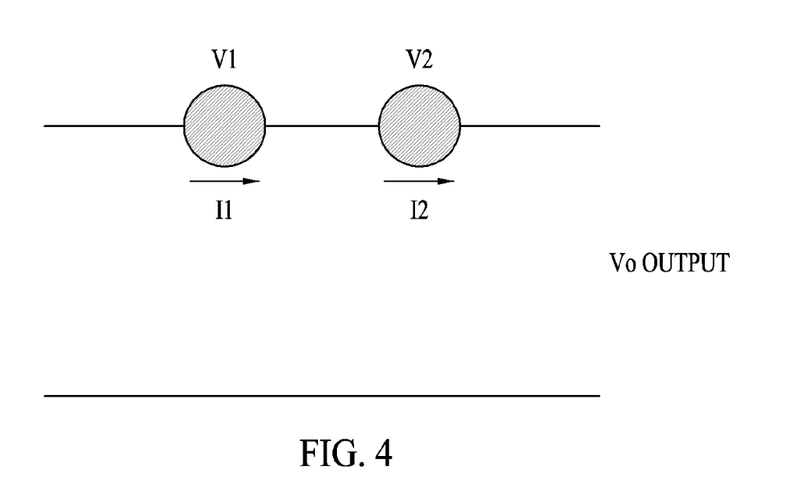
FIG. 4 is a structure modeling view for explaining a simple combination of magnetic cores.

First, a case where magnetic cores on lines are simply combined is described by using a simplification model. FIG. 4 is a structure modeling view for explaining a simple combination of magnetic cores.

As illustrated in FIG. 4, two magnetic cores installed in each distribution line are respectively modeled as nodes having a current source and voltage source, and a voltage and current for each node in this modeling may be expressed as the following Equation (9).

Equation 9

$$v_1=\cos u, i_1=\cos(u+\theta_1)$$
$$v_2=\cos v, i_2=\cos(v+\theta_2) \quad (9)$$

At each node, in view of characteristics of the magnetic core, there are phase differences $\theta_1$ and $\theta_2$ of the voltage and current. Powers P1 and P2 generated at the two nodes are expressed the following Equation (10).

Equation 10

$$P_1=\tfrac{1}{2}[\cos(2u+\theta_1)+\cos\theta_1]$$
$$P_2=\tfrac{1}{2}[\cos(2v+\theta_2)+\cos\theta_2] \quad (10)$$

Since a frequency of the distribution line is a commercial frequency, it is assumed that u=v and then the entire power, where P3=P1+P2, of the two magnetic cores is expressed as the following Equation (11).

Equation 11

$$P_3 = \cos\left(2u + \frac{\theta_1+\theta_2}{2}\right)\cos\left(\frac{\theta_1-\theta_2}{2}\right) + \frac{\cos\theta_1+\cos\theta_2}{2} \quad (11)$$
$$= \cos(2u+\theta_1) + \cos\theta_1$$

When it is assumed that the magnetic core is uniform, it may be that $\theta_1=\theta_2$. That is, the magnetic core is required to have uniform characteristics. As may be seen from Equation (11), the entire output power is not doubly increased just by connecting the magnetic cores in serial, but is increased by a small amount by phase differences of the voltage and current.

To address this, instead of directly connecting the magnetic cores, the power may be derived in a manner for summing powers after separately processing between voltages and between currents. Here, assuming that u=v and $\theta_1=\theta_2$ identically to the foregoing, the entire voltage and current are as Equation (12).

Equation 12

$$v_4=v_1+v_2=2\cos u$$
$$i_4=i_1+i_2=2\cos(u+\theta_1) \quad (12)$$

Since the power of the voltage and current respectively processed is represented as multiplication of the voltage and current, the entire power P4 is expressed as the following Equation (13).

Equation 13

$$P_4=v_4 i_4=2[\cos(2u+\theta_1)+\cos(2\theta_1)] \quad (13)$$

As may be seen from Equation (13), when voltages and currents are separately summed and then the power is obtained, a theoretical maximum power value is represented as double or greater, and slightly varies according to phase differences of voltages and currents.

Basically, in a separable magnetic core commonly called a current transformer, a voltage and current according to the number of windings are induced in lines wound around the magnetic core by a magnetic field, and the magnitudes thereof vary according to the magnetic field of the distribution line.

Like the Equations, there are two available methods for separately processing voltages and currents. One of them is to connect current transformers in parallel, but this does not basically address the issue, since interference between current transformers due to line current is not avoidable for an AC induction voltage and current, and an enclosure design should be separately performed. A second method may be realized in a manner for changing an output to a current source while adjusting a voltage at a certain level, and then summing them.

The present invention is to be realized in the second method, and to this end, a singe unit device is configured with a current transformer for generating induction current from line current and a converting unit for converting this to DC power. Furthermore, it is better to configure in a minimum size in order to realize various outputs through the unit device, and in this case, as expressed in Equations (1) and (2), a resonant frequency of the current transformer, particularly, the magnetic core, should have a certain relation with a frequency of primary line current. Accordingly, the unit device includes the current transformer for satisfying this condition and the converting unit for outputting a constant current.

Figure 5:
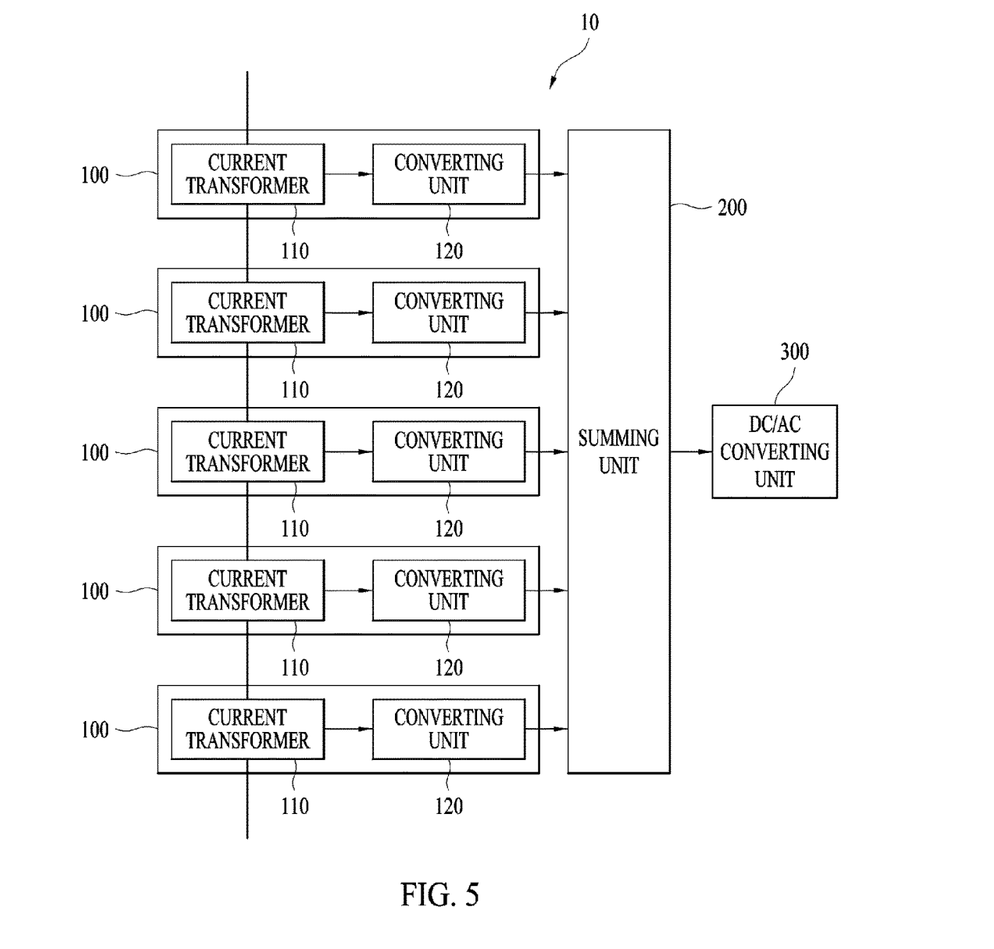
FIG. 5 is a block diagram of a magnetic induction power supplying device for linearly adjusting output power according to an embodiment of the present invention.

Hereinafter, a description will be provided about a magnetic induction power supplying unit according to an embodiment of the present invention with reference to FIG. 1. FIG. 5 is a block diagram of a magnetic induction power supplying device for linearly adjusting output power according to an embodiment of the present invention.

A magnetic induction power supplying device 10 includes a plurality of unit current transformer devices 100 for inducing power from lines, a summing unit 200 for summing a DC output of each of the unit current transfer device 100, and a DC/AC converting unit 300 for converting a DC output of the summing unit 200 to an AC value.

The unit current transformer device 100 includes a current transformer 110 for inducing secondary current from primary current flowing through the line in a magnetic induction manner, and a converting unit 120 for converting an output of the current transformer 110 to AC power. This unit current transformer device 100 is a basic unit for linearly adjusting an output from the magnetic induction power supplying device 10.

The current transformer 110 is better to have a resonant frequency doubly or greater than that of the primary current. For example, the current transformer 110 may have a cross-section area, a length, a relative permeability, and the number of loop windings of the magnetic core satisfying the resonant frequency in this condition.

In particular, the current transformer 110 is better to be configured in a minimum size satisfying this resonant frequency. In this way, the current transformer 110 limits the resonant frequency, for example, a resonant frequency of 120 Hz or more, which is double the commercial frequency, and accordingly a final output of the magnetic induction power supplying device 10 may be linearly adjusted according to the number of the unit current transformer devices 100. In addition, the current transformer is better to be a separable current transformer that is detachable.

Figure 6:
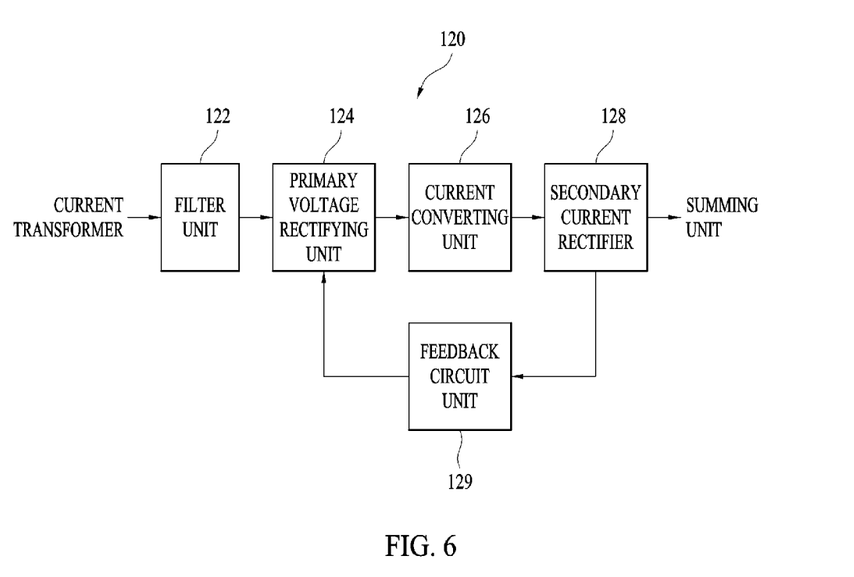
FIG. 6 is a detailed block diagram of the converter of FIG. 5.

The converting unit 120 is to convert a certain voltage source to a current source, and may be, for example, a buck converter as illustrated in FIG. 6, but is not limited thereto.

FIG. 6 is a detailed block diagram of the converter of FIG. 5.

The converting unit 120 includes a filter unit 122 for filtering an output of the current transformer 110, a primary voltage rectifying unit 124 for converting induction current of the current transformer 110 to a DC voltage, a current converting unit 126 for converting an output voltage from the primary voltage rectifying unit 124 to current, a secondary rectifying unit 128 for converting output current of the current converting unit 126 to DC current, and a feedback circuit unit 129 for protecting from an input overvoltage.

The filter unit 122 is to perform filtering on the induction current output of the current transformer 110, which provides secondary current, and is a filter for removing electromagnetic interference or other noise.

The primary voltage rectifying unit 124 may convert the filtered current input from the current transformer 110 to a DC voltage. For example, the primary voltage rectifying unit 124 may be implemented with a bridge diode and smoothing capacitor.

The current converting unit 126 converts the DC voltage output of the primary voltage rectifying unit 124 to current in order to output constant current, and for example, provides the current by adjusting duty of a switching device included therein in pulse width modulation (PWM) manner. This current converting unit 126 may be implemented with a PWM control IC included in the switch device (e.g. MOSFET).

The secondary current rectifying unit 128 may convert output current of the current converting unit 126 to DC current, and may include for example, a transformer for outputting current in secondary windings, which is induced by current input to primary windings, and a diode for smoothing an output of the transformer.

When a voltage input from the current transformer 110 is an overvoltage, the feedback circuit unit 129 may perform a protection operation for resetting a switching operation of the current converting unit 126. In addition, the feedback circuit unit 129 may detect the magnitude of current output from the secondary current rectifying unit 128 to the summing unit 200 and adjust the duty of the current converting unit 126 in order to constantly maintain the output.

Referring to FIG. 1 again, the summing unit 200 sums DC power output from the plurality of current transformer devices 100 to output the summed result, and the result may be linearly proportional to the number of the unit current transformer devices 100.

Optionally, an embodiment of the present invention may further include the DC/AC converting unit 300 for converting the output of the summing unit 200 to AC power. When a device corresponding to a load for requiring power needs AC power, in the embodiment of the present invention may optionally include the DC/AC converting unit 300 to provide the power in a proper type required by the load.

Figure 7:
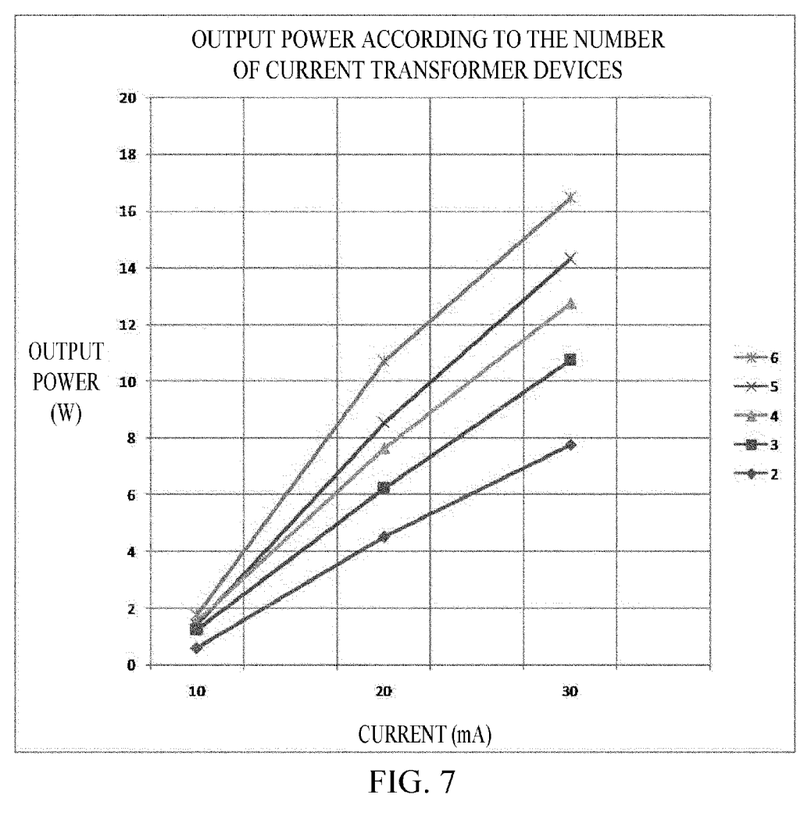
FIG. 7 is a graph for representing output power according to the number of current transformer devices according to an embodiment of the present invention.

An experiment result for the magnet induction power supplying device 10 configured like this is as illustrated in FIG. 7. FIG. 7 is a graph representing output power according to the number of current transformer devices according to an embodiment of the present invention.

As may be seen from FIG. 7, the magnet induction power supplying device 10 are linearly increased in proportion to the number of unit current transformer devices 100.

Figure 8:
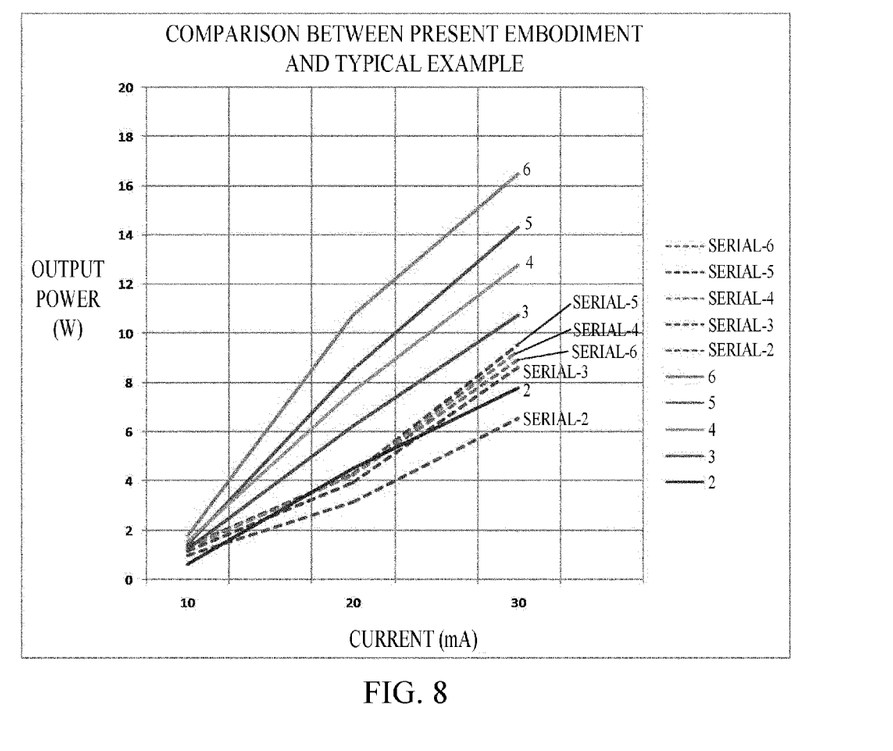
FIG. 8 is a graph for comparing an embodiment of the present invention and a typical example.

FIG. 8 is a graph for comparing an embodiment of the present invention and a typical example.

As may be seen from FIG. 8, when power is generated by directly connecting separable magnetic cores, which are power sources, to each other, even though two or more magnetic cores are connected, an output thereof is not greatly increased as represented in Equation (11). On the contrary, when outputs from the unit current transformer devices 100 according to an embodiment of the present invention are summed, it may be seen that the output from the magnet induction power supplying device 10 is increased in proportion to the number of the unit current transformer devices 100.

Accordingly, in order to linearly increase the output according to the number of added magnetic cores, the current transformer 110 and the converting unit 120 of the magnetic core are combined to one device, and then addition of this results in the same effect as represented in Equation (13), which the power is obtained after respectively processing the voltages and currents.

In other words, when the magnetic core is used as a power source, not as a sensor, and when implementation of a plurality of magnetic cores is needed, a design needs to be performed by a unit device structure including the magnetic core and the converting unit to easily achieve a necessary power amount, and this is not implemented with a regulator having a simple voltage converting function. Since this enables an enclosure to be designed only with a design for the unit current transformer device, this is cheaper in a view of expense, and conveniently implemented in a view of usage.

According to the configuration in this way, desirable output power may be easily designed by simply adding or removing identical unit current transformer devices that enable linear summing regardless of current flowing through the distribution line, and the unit current transformer device is detachable from the distribution line so that addition and removal of the unit current device is easy on the line according to a desirable output condition to improve installment and convenience of maintenance, thereby reducing the maintenance expense.

In addition, by using the unit current transformer device, an output may be linearly increased by simply adding or removing the unit current transformer unit and accordingly a desirable output power design may be easily achieved. In addition, there is no need to manufacture a separate enclosure or additional manufacturing may be minimized by using the current transformer device configured with minimum sized unit devices, and accordingly a manufacturing cost may be effectively reduced.

While this invention has been described with reference to exemplary embodiments thereof, it will be clear to those of ordinary skill in the art to which the invention pertains that various modifications may be made to the described embodiments without departing from the spirit and scope of the invention as defined in the appended claims.

The invention claimed is:

1. An apparatus comprising:
   a plurality of unit current transformer devices for linearly adjusting output power, each comprising:
      a current transformer connected to a line indirectly and detachably, and configured to induce current by using a magnetic field in the line; and
      a converting unit converting an output of the current transformer to DC power,
         wherein each converting unit includes:
            a primary voltage rectifying unit converting the induced current by the current transformer to a DC voltage;

a current converting unit converting the converted DC voltage by the primary voltage rectifying unit to a current; and a secondary current rectifying unit converting the converted current by the current converting unit to a DC current;

wherein the current has a resonant frequency double or greater than that of the current flowing through the line;

wherein the apparatus further comprises;

a summing unit summing each of the DC currents output from each of the plurality of unit current transformer devices and outputting the summed DC currents;

wherein an output by the summing unit is linearly proportional to the number of the plurality of unit current transformer devices.

2. The apparatus of claim 1, wherein each current transformer has a cross-section area, a length, a relative permeability, and a number of loop windings around the magnetic core satisfying the resonant frequency.

3. The apparatus of claim 1, wherein each current transformer has a minimum size for satisfying the resonant frequency.

4. The apparatus of claim 1, wherein each current transformer is a separable current transformer.

5. The apparatus of claim 1, wherein each current converting unit is controlled with a pulse width modulation.

6. The apparatus of claim 1, further comprising:

a DC/AC converting unit converting an output by the summing unit to an AC power.

* * * * *